Patented July 27, 1937

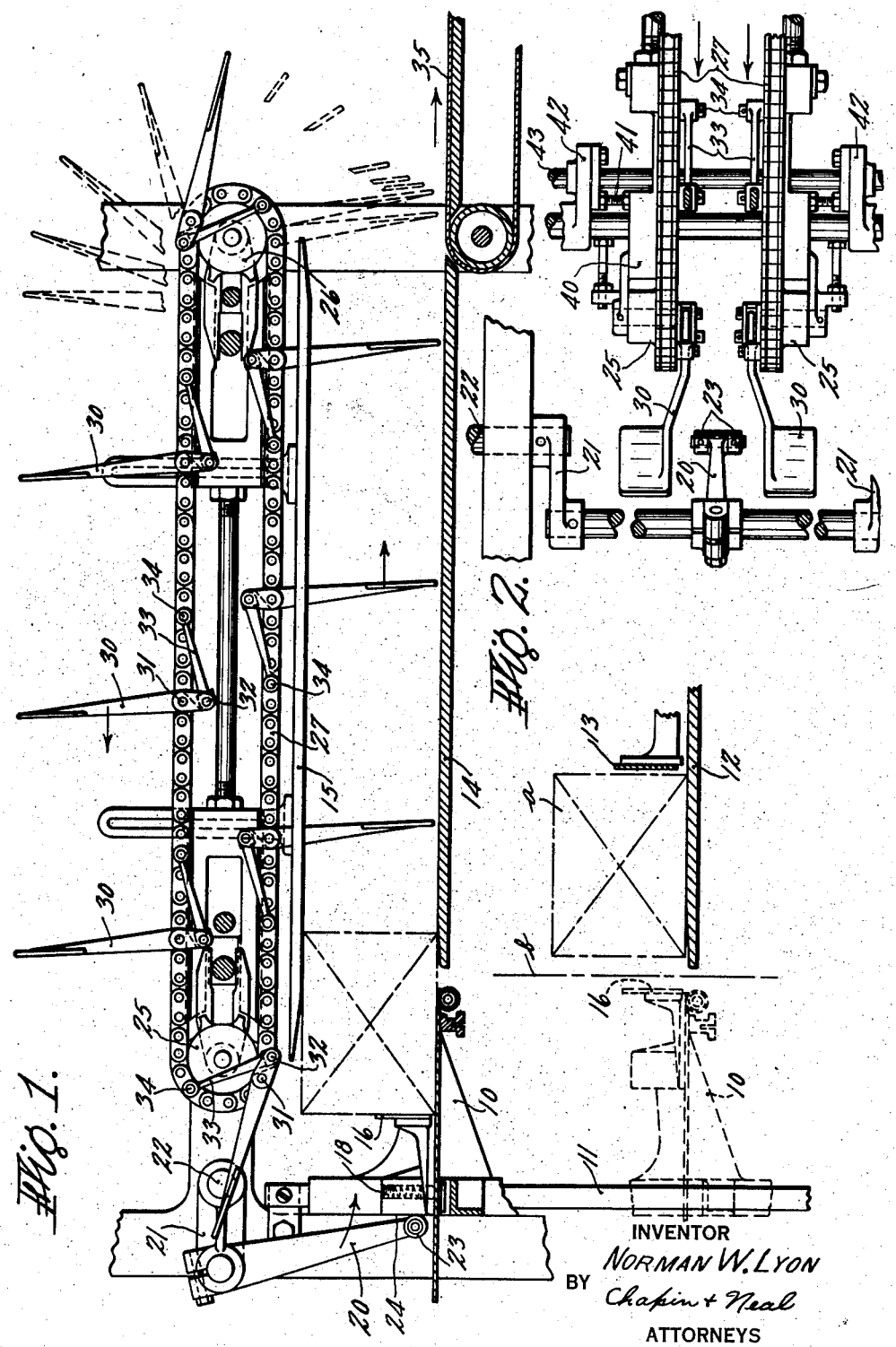

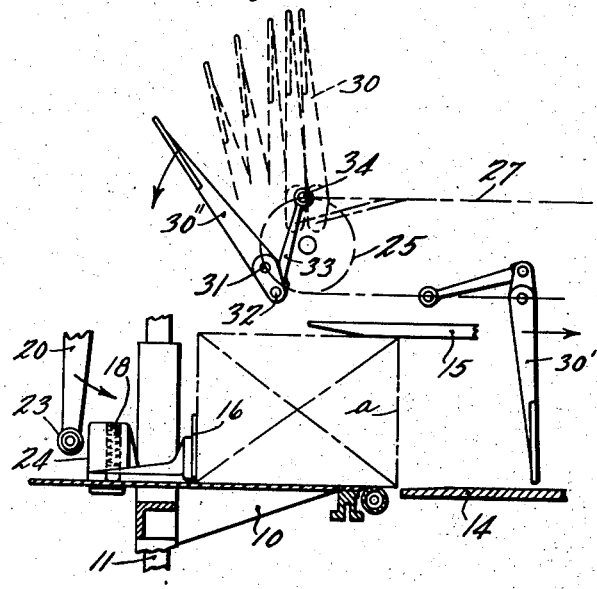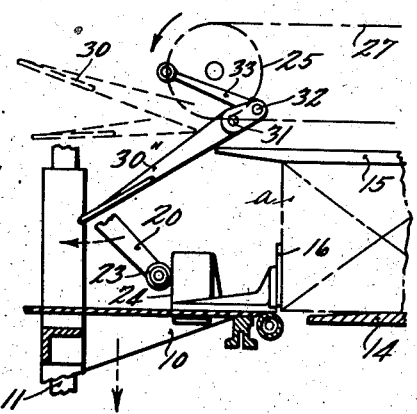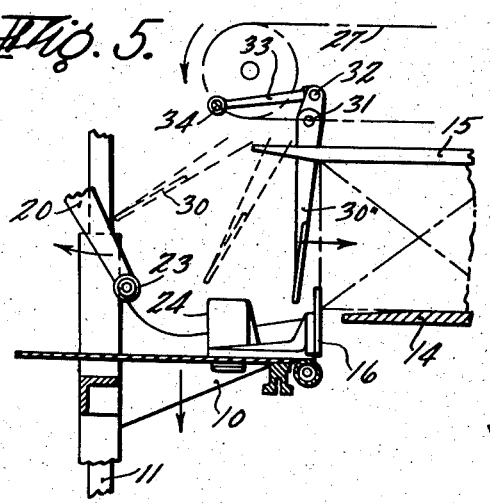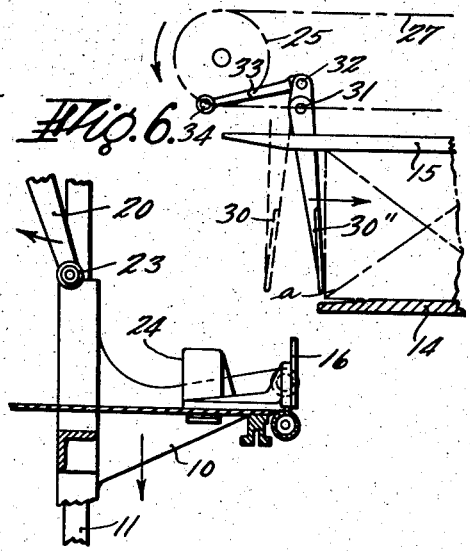

2,088,269

UNITED STATES PATENT OFFICE 2,088,269

WRAPPING MACHINE

Norman W. Lyon, Springfield, Mass., assignor to National Bread Wrapping Machine Co., Springfield, Mass., a corporation of Massachusetts Application February 25, 1935, Serial No. 7,991

13 Claims. (Cl. 93—2)

This invention relates to wrapping machines, and is particularly directed to mechanism for forwarding the articles to be wrapped through the several wrapping mechanisms. The invention is particularly adapted for use with that type of wrapping machine in which an article is raised by suitable mechanism to the level of a wrapping or delivery channel, performing in this movement certain of the wrapping functions; and in which the article so elevated is carried along the channel by a conveyer having an endless series of pushers. In this type of machine the article is raised into the space between two consecutive pushers of the series and is then removed from the elevating means and carried along the channel. An example of this type of wrapping machine is found in the Smith and Hoppe Patent 1,953,195, April 3, 1934. One problem in machines of this type is to decrease as much as possible the time during which the article elevating means must remain at its upper position, since this is in certain respects idle time during which other functions of the machine must be held in abeyance. Another problem is to keep the overall length of the machine as small as possible giving as a corollary the requirement that the rapidity of passage of the article through the wrapping and delivery channel must be kept down, since an article must remain within the channel for a certain minimum period in order to complete the sealing together of the overlying folds of the wrapper.

One object of the present invention is to provide an article handling mechanism including an endless conveyer having a continuous motion and at the same time a smaller distance between the successive pushers than has heretofore been possible. Another object is to provide an endless conveyer for carrying an article through this type of wrapping machine having a lower linear speed for the same output as contrasted with prior mechanisms. Another object is to provide a delivery conveyer for use in that type of wrapping machine having means for moving an article between adjacent pushers of the conveyer, in which the conveyer will function to receive and forward the articles without requiring intermittent operation of the conveyer or excessive spacing of its pushers. Another object is to provide a delivery conveyer adapted to deliver articles onto a belt moving at less speed than the conveyer itself, without subjecting the article to any substantial slippage over the belt. Additional objects will appear from the following description and claims.

Referring to the drawings—

Fig. 1 is a side elevation of a portion of a wrapping machine to which my improved mechanism has been applied;

Fig. 2 is a fragmentary top plan thereof; and

Figs. 3 to 6 are diagrammatic views illustrating the operation of the mechanism.

The wrapping machine to which the invention is shown as being applied has an article elevator or carrier 10 vertically reciprocable on guides 11 by suitable mechanism. At its lower terminus the carrier lies opposite an article feeding-in station 12, from which an article a and a wrapper b are forced onto the carrier by a horizontally reciprocating pusher 13. At its upper terminus the carrier lies opposite a delivery or wrapping channel 14, above which is an article retaining rail 15. Slidable back and forth on the carrier is a backing plunger 16, which serves both to clamp the wrapper to the article as they are being moved onto the carrier and to assist in the rapid expulsion of the article from the carrier when the carrier is opposite the channel 14. In order to maintain the plunger 16 in whatever position it may be in, unless it is shifted by some external force, and in order to give a clamping pressure to the wrapper as the article is moving onto the carrier, the backing plunger is provided with a spring friction device 18 which presents a regulable resistance to its motion on the carrier.

When the carrier is at the upper limit of its motion, an ejecting device comes into play to move the article rapidly onto the delivery channel 14, and thereby to permit the carrier to begin its descent without waiting for the article to be cleared from it by the slower moving delivery conveyer. This ejecting device comprises an arm 20 adjustably secured between oscillating arms 21 carried by shafts 22. At the end of the arm 20 are rollers 23 adapted to engage an abutment 24 on the backing plunger 16 and to move it in the manner clearly indicated by a comparison of Figs. 3 to 6.

Above the channel defined by the plate 14 and the holding rail 15 are spaced pairs of sprockets 25, 26 connected by chains 27 and rotated continuously in any desired manner. The sprockets are preferably adjustable lengthwise of the channel to take up chain slack and to obtain an accurate position relative to the carrier 10 in any of the standard ways not necessary to illustrate here, the sprockets 25 being located substantially in line with the article being raised by the carrier. A series of pushers 30 are pivoted to the conveyer chains, the two sets of pushers preferably being spaced apart to straddle the rail 15 as is clearly indicated in Fig. 2. Each pusher is pivoted to a chain at 31, preferably to an extension of one of the chain pintles. Each pusher also has an arm extending beyond its pivot and pivoted at 32 to a link 33 which in turn is pivoted to one of the chain pintles at 34. The two pivots 31 and 34 are spaced apart along the length of the chain a substantial distance, the exact amount depending upon the length of the rearward extensions of the pushers and the diameter of the sprockets 25, 26.

Normally the pushers stand out straight from the chains, being held rigidly in that position by the links 33. As the pushers go around the sprockets, however, a special and important action takes place which greatly improves the cooperation of the conveyer and the carrier 10. It will be seen from Fig. 3 that as the pusher turns around the sprocket 25 the pivot 32 is pushed forwardly by the link 33, causing the pusher itself to be tilted rearwardly. After the position of Fig. 4 has been reached the pusher gradually reassumes its normal position, the net effect of the motion described being to delay the pushers during the first part of their motion around the sprockets 25 and to speed up the motion an equivalent amount as the pusher comes into line with the edge of the channel floor 14. This action is readily understood from Figs. 3 to 6, where the successive positions of the pusher are taken at equal time intervals.

As the carrier with the article thereon rises into alignment with the channel floor 14, as shown in Fig. 3, one pusher 30' has just passed the edge of the floor 14, carrying an article ahead of it. The next succeeding pusher 30'' is at this time passing around the sprocket 25, and is being held back by its link 33. The gradual drawing back of the pusher is clearly shown by the successive dotted positions in Fig. 3, which it will be remembered are taken at equal intervals of time. Forward movement of the backing plunger 16 as soon as the carrier has risen is caused by the swinging arm 20, the action of which is progressively shown by Figs. 3, 1, and 4, taken in that order. During the ejection of the article from the carrier the pusher 30'' is trailing behind its normal position at right angles to the chain, and in the region of movement shown in Figs. 4 and 5 accelerates its movement to catch up to the article which has been moved ahead of it. Final contact with the article, however, is preferably delayed until the backing plunger 16 has been lowered sufficiently to avoid any interference. The pusher 30'' carries the article along the channel 14 steadily, once contact has been established, the rate of movement being less for the same output than what would be necessary were an intermittent conveyer drive to be used or a sufficiently wide spacing between pushers employed to permit the entry of an article between the pushers without the special linkage described. It will be clear from Fig. 1 that the effect of the linkage is to produce an apparent increase in the spacing of the pushers at the point where the article is delivered by the carrier.

The conveyer structure described has also an important function as the articles are delivered onto the conventional belt 35 by which they are carried through the cooling apparatus. It is customary to set the speed of this belt so that the articles are substantially in contact with each other, the belt speed therefore being considerably below that of the pushers. It will be observed from Fig. 1 that the pushers slow up as they bring the articles over the belt, permitting the articles to assume the lower speed of the belt without shock and with a minimum of friction.

The chains 27 and the pushers 30 carried by them are preferably adjustable laterally of the machine so that the pushers will always contact the articles near their ends. It is also preferable to have the pushers adjustable simultaneously with the side folders. For this purpose the chain carrying sprockets 25, 26 are mounted on brackets 40 joined by studs 41 to the brackets 42 which carry the various side folders. These latter brackets are mounted on transverse rods 43, and are preferably adjustable sideways by right and left screws in the manner described in the Smith and Hoppe Patent 1,953,195.

I claim:

1. In a wrapping machine, a channel along which the articles pass, supporting members extending transversely of the channel, brackets laterally movable on said members, spaced pairs of sprockets carried on said brackets, parallel chains passing over the sprockets, and a series of pushers carried separately by each of the chains, whereby the pushers may be adjusted laterally to bear against the articles adjacent their ends.

2. In a wrapping machine, a wrapping channel, a continuously movable pusher series carrying successive articles through the channel, means for introducing articles successively into line with the channel in the spaces between successive pushers, and means for removing articles from the position in which they are placed by said introducing means and giving them an initial movement along the channel at a speed higher than the speed of movement of the pushers along the channel.

3. In a wrapping machine, a wrapping channel, a continuously movable pusher series carrying successive articles through the channel, means for temporarily and locally separating two adjacent pushers of the series, means for introducing articles successively into line with the channel in the space between two separated pushers, and means for removing articles from the position in which they are placed by said introducing means and giving them an initial movement along the channel at a speed higher than the speed of movement of the pushers along the channel.

4. In a wrapping machine, a wrapping channel, a continuously moving chain adjacent the channel, a series of pushers carried by said chain and projecting into the channel, means for temporarily and locally moving the pushers individually rearwardly with respect to the chain to give an abnormal separation between the pusher so moved and the pusher located forwardly thereof, means for introducing articles successively into line with the channel in the abnormal space between the pushers so separated, and means for removing articles from the position in which they are placed by said introducing means and giving them an initial movement along the channel at a speed higher than the speed of movement of the pushers along the channel.

5. In a wrapping machine, a horizontal wrapping channel, a continuously moving chain adjacent the channel and having a portion extending parallel therewith, a series of pushers carried by said chain and projecting into the channel, means for temporarily and locally moving the pushers individually rearwardly with respect to the chain to give an abnormal separation between the pusher so moved and the pusher located forwardly thereof, an elevator movable to raise articles successively into line with the channel in the abnormal space between the pushers so separated and to drop out of contact with the article before the rearward one of the two separated pushers contacts with the article, and means for removing articles from the position in which they are placed by said introducing means and giving them an initial movement along the channel at a speed higher than the speed of movement of the pushers along the channel to carry the article into the channel before the support of the elevator is withdrawn.

6. In a wrapping machine, a channel along which the articles pass, sprockets spaced along the length of the channel and located to one side of it, a chain passing around the sprockets, a series of pushers pivoted to the chain and each having an arm extending beyond the point where said pusher is pivoted to the chain, a link pivoted to each of said arms and pivoted to the chain at a point to the rear of the point where the pusher is pivoted to the chain, whereby the pushers will be tilted rearwardly with respect to the chain as they pass around the sprockets, and means for introducing an article into line with the channel at a point substantially opposite to one of the sprockets and timed in its action to carry the article into the space between one pusher which is moving along the channel and a pusher to the rear thereof which is tilted rearwardly by the action of said link to provide an abnormally large space between said two pushers and to avoid interference by the rearward one of the two pushers with the side of the article which is to be to the rear during the advance of the article along the channel.

7. In a wrapping machine, a wrapping channel, a continuously moving pusher series carrying successive articles in spaced relation through the channel, a delivery conveyor moving at a speed less than that of the pushers and to which the articles are delivered by the pushers, and means for retarding the speed of the pushers individually as they are transferring an article to the delivery conveyor so that the article acquires the lower speed of the delivery conveyor without substantial slip between it and said conveyor.

8. In a wrapping machine, a wrapping channel, a continuously driven chain adjacent said channel, a series of pushers carried by said chain, a delivery conveyor moving at a speed less than that of the chain and to which the articles are delivered by the pushers, and means for tilting the pushers individually rearwardly with respect to the chain as they are transferring an article to the delivery conveyor so that the article acquires the lower speed of the delivery conveyor without substantial slip between it and said conveyor.

9. In a wrapping machine, a wrapping channel, a continuously driven chain adjacent said channel, spaced sprockets supporting said chain, a delivery conveyor moving at a speed less than that of the chain and positioned to engage the articles at substantially the region where the chain passes around one of the sprockets, and means for tilting the pushers individually rearwardly with respect to the chain as they are passing around said sprocket so that their speed along the channel is reduced and the article is permitted to acquire the lower speed of the delivery conveyor without substantial slip between it and said conveyor.

10. In a wrapping machine, a wrapping channel, means for elevating an article to the level of said channel, means for ejecting the article rapidly from the elevating means to the channel, a continuously moving chain above the channel, sprockets supporting the chain, one of said sprockets being located substantially in line with the motion of the article as it is raised by the elevating means and the other of said sprockets being located at a point spaced along the wrapping channel, a series of pushers carried by said chain, a delivery conveyor moving at a speed less than that of the chain and positioned to engage the articles carried by the pushers at substantially the point where the chain passes around the second of said sprockets, and means for tilting the pushers rearwardly with respect to the chain as they pass around both of said sprockets, the tilting of the pushers as they pass around the first sprocket serving to avoid interference with the rear of the articles as they are being elevated and ejected into the channel and the tilting of the pushers as they pass around the second sprocket serving to reduce the speed of the articles along the channel and thereby permit the articles to acquire the lower speed of the delivery conveyor without substantial slip between them and the delivery conveyor.

11. In a wrapping machine, a wrapping channel, a pusher series carrying successive articles through the channel, means for introducing articles successively into line with the channel in the spaces between successive pushers, and means independent of said pusher series for removing articles from the position in which they are placed by said introducing means and giving them an initial movement along the channel.

12. In a wrapping machine, a wrapping channel, an endless carrier movable in a single direction adjacent the channel, a series of pushers normally projecting at substantially right angles from the carrier and carried by it through the channel, means for temporarily and locally moving the pushers individually to incline them rearwardly from their normal position with respect to the carrier to give an abnormal separation between the pusher so moved and the pusher located forwardly thereof, and means for introducing articles successively into line with the channel in the abnormal space between the pushers so separated.

13. In a wrapping machine, a wrapping channel, an endless carrier movable in a single direction adjacent the channel, a series of pushers normally projecting at substantially right angles from the carrier and carried by it through the channel, means for temporarily and locally moving the pushers individually to incline them rearwardly with respect to the carrier to give an abnormal separation between the pusher so moved and the pusher located forwardly thereof, means for introducing articles successively into line with the channel in the abnormal space between the pushers so separated, and means independent of said pushers for removing articles from the position in which they are placed by said introducing means, and giving them an initial movement along the channel.

NORMAN W. LYON.